United States Patent
Yoshizawa et al.

(10) Patent No.: US 6,711,168 B1
(45) Date of Patent: Mar. 23, 2004

(54) TERMINATING APPARATUS FOR ATM ADAPTATION LAYER

(75) Inventors: Jinichi Yoshizawa, Kawasaki (JP); Shigeatsu Samukawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/421,466

(22) Filed: Oct. 19, 1999

(30) Foreign Application Priority Data

Nov. 10, 1998 (JP) .......................... 10-318584

(51) Int. Cl.⁷ ............................. H04L 12/28
(52) U.S. Cl. ................... 370/395.1; 370/473; 370/474; 714/758
(58) Field of Search ................. 370/395, 473, 370/474, 392, 397, 395.1; 714/746, 758

(56) References Cited

U.S. PATENT DOCUMENTS

| | | | | |
|---|---|---|---|---|
| 5,414,707 A | * | 5/1995 | Johnston et al. | 370/395.6 |
| 5,604,743 A | * | 2/1997 | Le Guigner et al. | 370/392 |
| 5,742,765 A | * | 4/1998 | Wong et al. | 709/230 |
| 5,796,735 A | * | 8/1998 | Miller et al. | 370/395.4 |
| 5,809,024 A | * | 9/1998 | Ferguson et al. | 370/395.53 |
| 5,870,394 A | * | 2/1999 | Oprea | 370/392 |
| 5,917,828 A | * | 6/1999 | Thompson | 370/474 |
| 6,317,433 B1 | * | 11/2001 | Galand et al. | 370/395.2 |

* cited by examiner

Primary Examiner—Kenneth Vanderpuye
Assistant Examiner—Nittaya Juntima
(74) Attorney, Agent, or Firm—Katten Muchin Zavis Rosenman

(57) ABSTRACT

A terminating apparatus for an ATM adaptation layer is made of hardware logic circuits to terminate received cells connection by connection and assemble an ATM adaptation layer message for each connection from data contained in the received cells. The apparatus is compact and operates at high speed. The structure of the apparatus is independent of the number of connections to terminate. The apparatus has a-header extractor (4-6) for extracting a virtual path indication/virtual channel indication (VPI/VCI) from a received cell, a CRC unit (4-5) shared by cells of different connections, a reception processor (4-4) for determining whether or not the received cell is the last cell of an ATM adaptation layer message according to a payload type indication (PTI) contained in a header of the received cell and processing the received cell, a work memory (4-8) for storing, for each connection, a CRC result and the number of received cells, and a reception buffer (4-9) for sequentially storing, for each connection, data contained in cells received for the connection.

8 Claims, 7 Drawing Sheets

TERMINATING APPARATUS FOR ATM ADAPTATION LAYER

BACKGROUND OF THE INVENTION

1. Field of the Invention

The present invention relates to a terminating apparatus for an ATM (asynchronous transfer mode) adaptation layer, which is a layer in ATM communication to provide matching and adjusting services between a higher application layer and an ATM layer that collectively handles ATM cells containing 48-byte user data. In particular, the present invention relates to a terminating apparatus, made of hardware logic circuits, to serve in the ATM adaptation layer.

2. Description of the Related Art

ATM communication transfers cells each consisting of a 5-byte header and 48-byte fixed-length data, and the higher application layer transfers variable-length data in the range of several bytes to several kilobytes. There is a necessity of, therefore, dividing the variable-length data into the fixed-length cells and assembling the fixed-length cells into the variable-length data.

These dividing and assembling operations are carried out according to standardized ATM adaptation layer (AAL) protocols.

Presently, AAL protocols of types 1 to 5, are standardized. Among them, the AAL type 5 protocol is simple and is widely used for ATM-LANs.

FIG. 1 shows a frame format of the AAL type 5 protocol. Each cell in an ATM layer has a cell header that contains a payload type indication (PTI). The PTI is used to determine whether or not the cell is the last cell of an AAL message of the ATM adaptation layer. Cells shown in A of FIG. 1 are sequentially received and, according to reception order, 48-byte fixed-length payloads of the cells are extracted to form an AAL message of B of FIG. 1. The ATM adaptation layer is terminated when the last cell of the AAL message is received. In FIG. 1, a number "x" indicated as (x) represents the number of bytes.

One AAL message is made of ① user data, ② PAD (padding that is meaningless data used to adjust the length of the AAL message to the total length of-cells), ③ CPCS-UU (common part convergence sublayer user-to-user indication), ④ CPI (common part indication, ⑤ the length of the user data, and ⑥ CRC (cyclic redundancy check) code used to find bit errors between the start of the AAL message and a field in front of the CRC field. The fields ③ to ⑤ form an AAL trailer.

The decomposition and assembling of an AAL message is called SAR (segmentation and reassembly). The present invention provides a terminating apparatus for the ATM adaptation layer, employing hardware logic circuits that are optimum for SAR.

The ATM communication shares each channel among cells of many users. To transfer cells from a first user to a second user, the ATM communication sets a virtual connection between the first and second users and adds data to identify the virtual connection to each cell to be transferred from the first user to the second user.

The virtual connection established between the first and second users is identifiable with a VPI (virtual path identifier) and a VCI (virtual channel identifier) that are contained in the header of each cell transferred between the first and second users. Hereinafter, the VPI and VCI are referred to as VPI/VCI. The terminating of the ATM adaptation layer is carried out for each connection according to VPI/VCI contained in each cell header.

FIG. 2 is a block diagram showing a terminating apparatus for an ATM adaptation layer employing hardware logic circuits according to a prior art. A physical layer terminator 2-1 receives cells, terminates a physical layer of the cells, and transfers the cells as ATM-layer cells to a header detector 2-2.

The header detector 2-2 finds a cell header in each cell, picks up VPI/VCI from the cell header, identifies a connection of the cell, and transfers the cell to a CRC unit 2-3 assigned to the connection. The header detector 2-2 also picks up a payload type indication (PTI) from the cell header and determines whether or not the cell is the last cell of an AAL message.

The number of the CRC units 2-3 is equal to the number of connections to be simultaneously set. Namely, the prior art must arrange the CRC units 2-3 for simultaneous connections, respectively. Each CRC unit 2-3 carries out a cyclic redundancy check on the payload of a received cell and stores the payload in a corresponding reception buffer 2-4.

When the header detector 2-2 detects the last cell of an AAL message related to a given connection, the assembling of the AAL message in the corresponding reception buffer 2-4 is completed, and the given connection is terminated in the ATM adaptation layer.

Cells are multiplexed and demultiplexed through a cross connection apparatus, etc., and a transmission sequence of cells of each connection is secured. However, a plurality of connections are randomly set in the same transmission line, and therefore, the number of the CRC units 2-3 must be equal to the number of connections to be simultaneously terminated.

As explained above, it is easy to form a terminating apparatus for each connection for the ATM adaptation layer with hardware logic circuits. If the number of connections to simultaneously terminate increases, the prior art must increase the number of termination circuits including the CRC units 2-3 and reception buffers 2-4 to cope with the increased number of connections. This enlarges the scale of the apparatus.

Namely, the prior art has limits on a packaging scale and the number of connections to simultaneously terminate. To cope with this, firmware may be employed to handle connections above the limit of hardware logic terminating circuits.

FIG. 3 is a block diagram showing a terminating apparatus according to a prior art employing firmware for terminating connections in the ATM adaptation layer. A physical layer terminator 3-1 receives cells, terminates a physical layer of the cells, and stores ATM layer cells in a reception buffer 3-2.

A microprocessor (MPU) 3-3 has the firmware to read the cells from the reception buffer 3-2, carries out segmentation and reassembly processes for each connection, and terminates the ATM adaptation layer of each connection.

According to the structure of FIG. 3, the number of connections to terminate is independent of hardware scale. The speed of the segmentation and reassembly processes, however, is dependent on the capacity of the MPU 3-3. As the speed of input cells increases, the MPU 3-3 must operate at higher speeds. Since the processing speed of the MPU 3-3 is limited, the speed of input cells must be limited.

In this way, the prior art of FIG. 2 must prepare hardware logic circuits for each of connections to be simultaneously set and terminated in the ATM adaptation layer. If the number of simultaneous connections is increased, the prior art must increase the amount of the hardware. Namely, the prior art has a limit on the number of connections to terminate.

On the other hand, the prior art of FIG. 3 that employs firmware to terminate the ATM adaptation layer involves a slow processing speed, and therefore, is inapplicable to cells transferred at high speeds.

SUMMARY OF THE INVENTION

An object of the present invention is to provide a terminating apparatus for the ATM adaptation layer for terminating connections that are simultaneously set. The apparatus is made of hardware logic circuits whose number is independent of the number of-connections to terminate. The apparatus is compact and realizes high-speed termination.

In order to accomplish the object, a first aspect of the present invention provides a terminating apparatus for an ATM adaptation layer for terminating received cells connection by connection and assembling an ATM adaptation layer message, for each connection, from data contained in the received cells. The apparatus has a header extractor for extracting VPI/VCI from a received cell, a CRC unit shared by cells of different connections, a reception processor for determining, based on a payload type indication (PTI) contained in the header of the received cell, whether or not the received cell is the last cell of an ATM adaptation layer message prepared for a connection related to the received cell and processing the received cell, a work memory for storing, for each connection, a CRC result and the number of received cells, and a reception buffer for sequentially storing, for each connection, data extracted from received cells.

According to a second aspect of the present invention, the work memory has, for each connection, a part for storing an address of the reception buffer where the latest data received for the connection is stored. Whenever a cell related to the connection is received, the reception processor reads the address and stores data extracted from the received cell into the reception buffer at an address just after the read address.

According to a third aspect of the present invention, the header extractor, CRC unit, and reception processor are common to all connections to terminate. The work memory and reception buffer are each a memory that is expandable to cover an increase in the number of connections to terminate.

According to a fourth aspect of the present invention, the reception processor determines whether the received cell is at the start, or in the middle, or at the end of the corresponding connection according to the determination whether or not the received cell is the last cell of the ATM adaptation layer message, updates a CRC result and the number of received cells of the corresponding connection in the work memory, and processes a payload of the received cell. The apparatus also has a DMA controller for transferring, for each connection, a CRC result between the CRC unit and the work memory according to VPI/VCI extracted by the header extractor and transferring data extracted from a received cell to the reception buffer according to an instruction from the reception processor.

According to a fifth aspect of the present invention, the reception processor determines that the received cell is the start cell of the ATM adaptation layer message if the number of received cells of the corresponding connection is zero and if the received cell is not the last cell of the ATM adaptation layer message, operates the CRC unit from an initial state, stores a CRC result in a corresponding area of the work memory, and increments the number of received cells by one. The reception processor determines that the received cell is an intermediate cell of the ATM adaptation layer message if the number of received cells of the corresponding connection is not zero and if the received cell is not the last cell of the ATM adaptation layer message, reads a CRC result acquired on the preceding cell from the corresponding area of the work memory, loads the read CRC result to the CRC unit, operates the CRC unit accordingly, updates the CRC result in the work memory accordingly, and increments the number of received cells by one. The reception processor assembles the ATM adaptation layer message from data sequentially stored in the reception buffer for the corresponding connection if the received cell is the last cell of the ATM adaptation layer message and resets the CRC result and the number of received cells in the corresponding area of the work memory to zero.

According to a sixth aspect of the present invention, the reception processor compares, if the received cell is the last cell of the ATM adaptation layer message, the number of cells received in connection with the corresponding connection stored in the corresponding area of the work memory with a user data length stored in a trailer of the assembled ATM adaptation layer message, and determines whether or not the data length of the assembled ATM adaptation layer message is correct.

According to a seventh aspect of the present invention, the reception processor refers to the user data length stored in the trailer of the assembled ATM adaptation layer message and separately stores the user data and trailer of the message in the reception buffer.

According to an eighth aspect of the present invention, the ATM adaptation layer message is a message of the ATM adaptation layer type 5 protocol.

BRIEF DESCRIPTION OF THE DRAWINGS

The present invention will be more clearly understood from the description as set forth below with reference to the accompanying drawings, in which.

DESCRIPTION OF THE PREFERRED EMBODIMENTS

Figure 4:
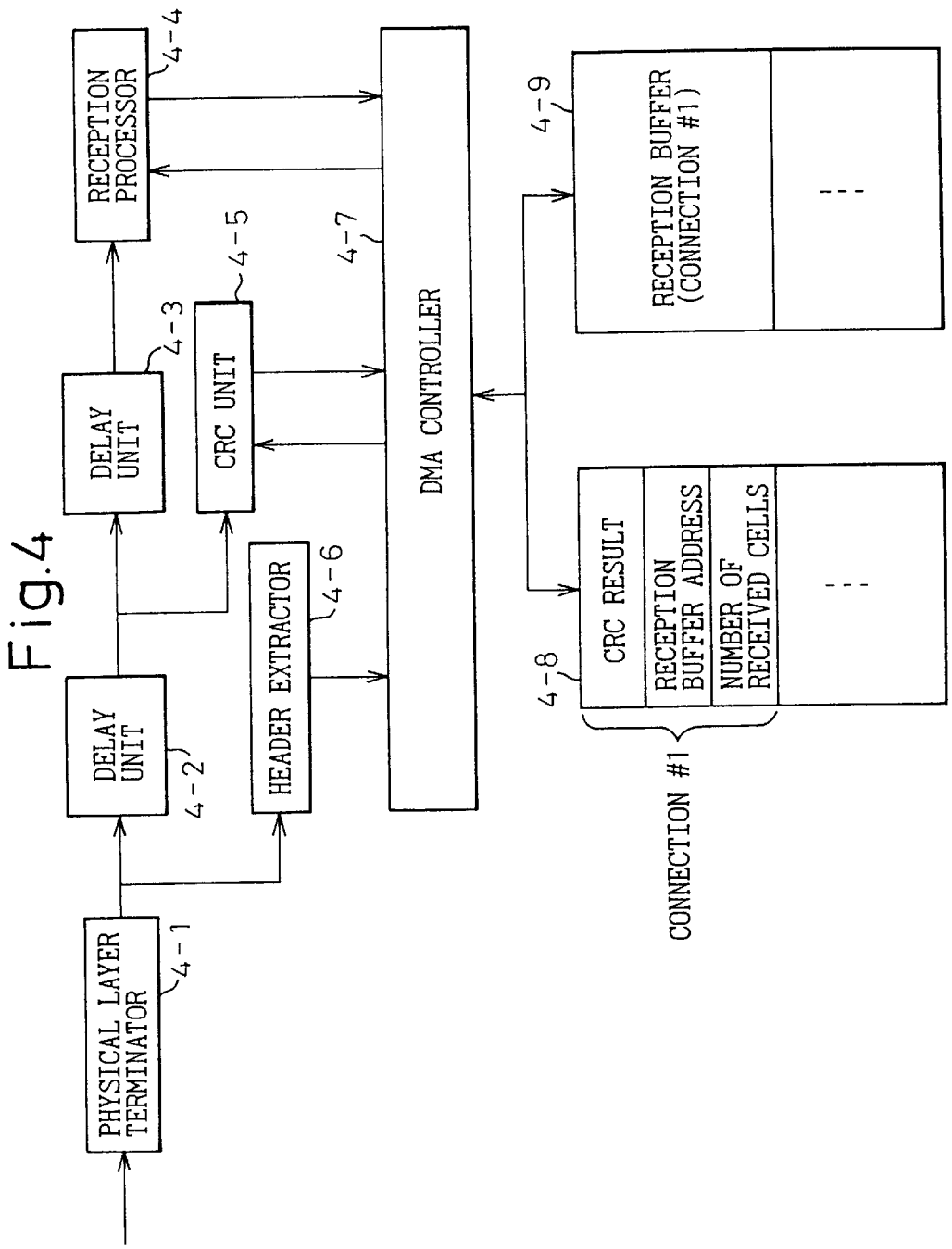
FIG. 4 is a block diagram showing a terminating apparatus for an ATM adaptation layer according to an embodiment of the present invention.
Figure 5:
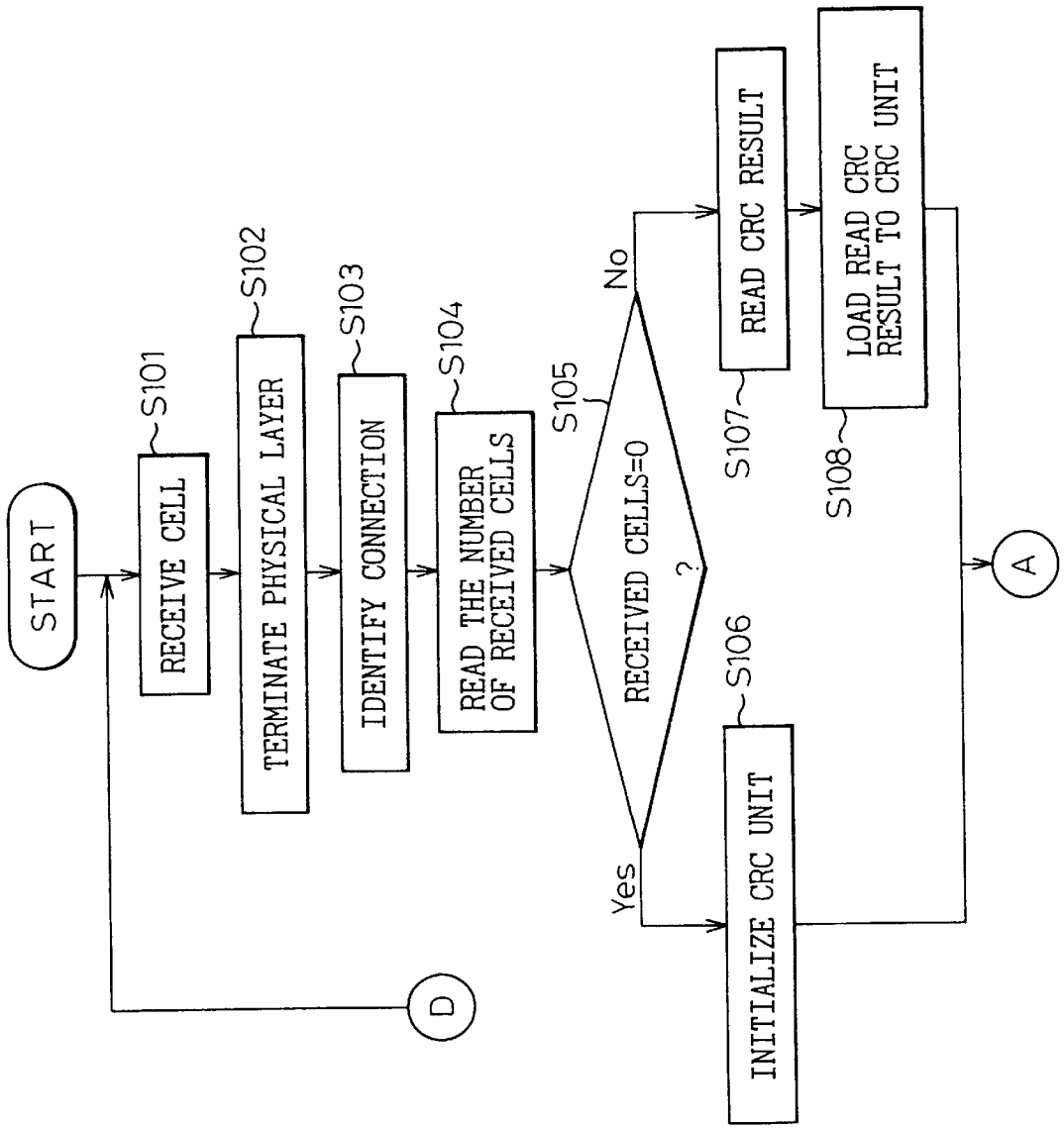
FIGS. 5 to 8 are flowcharts showing the operation of the apparatus of FIG. 4.
Figure 6:
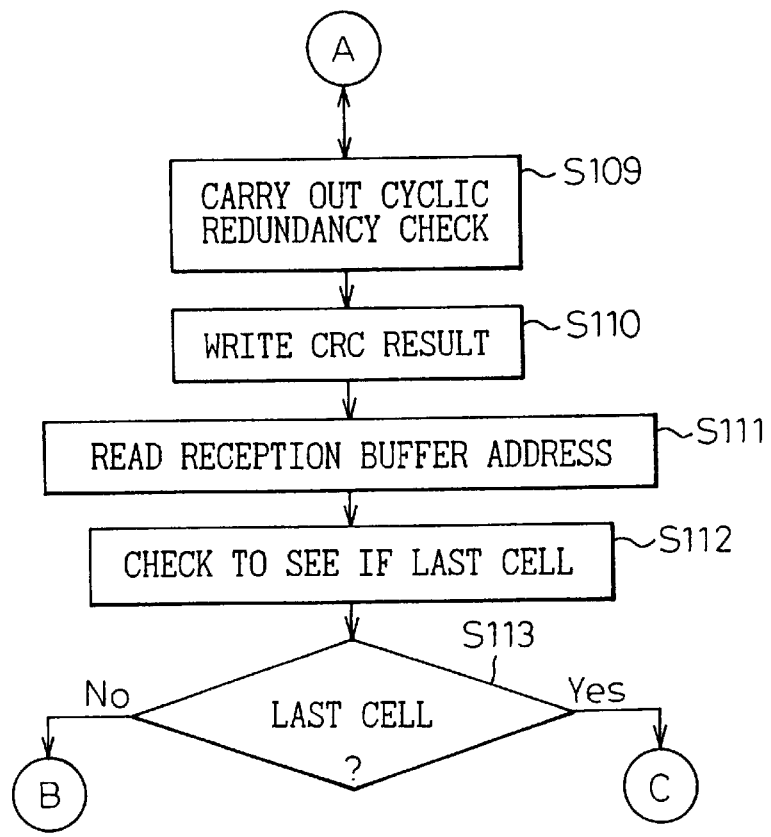
Figure 7:
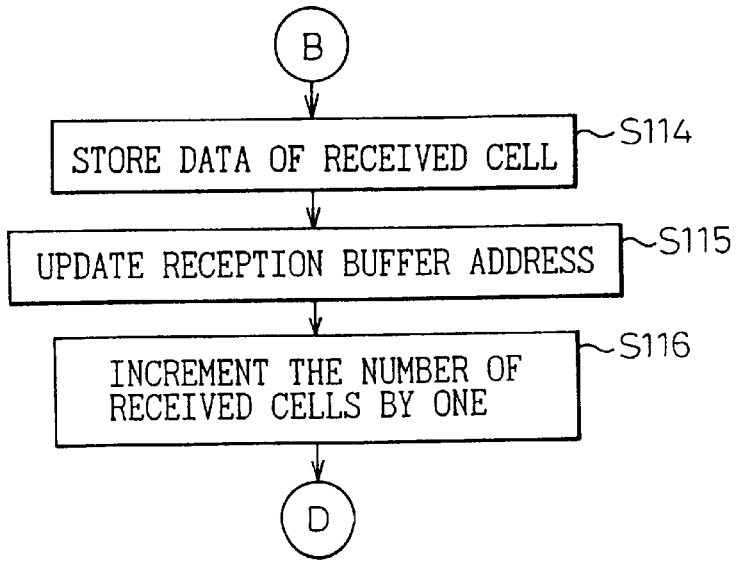
Figure 8:
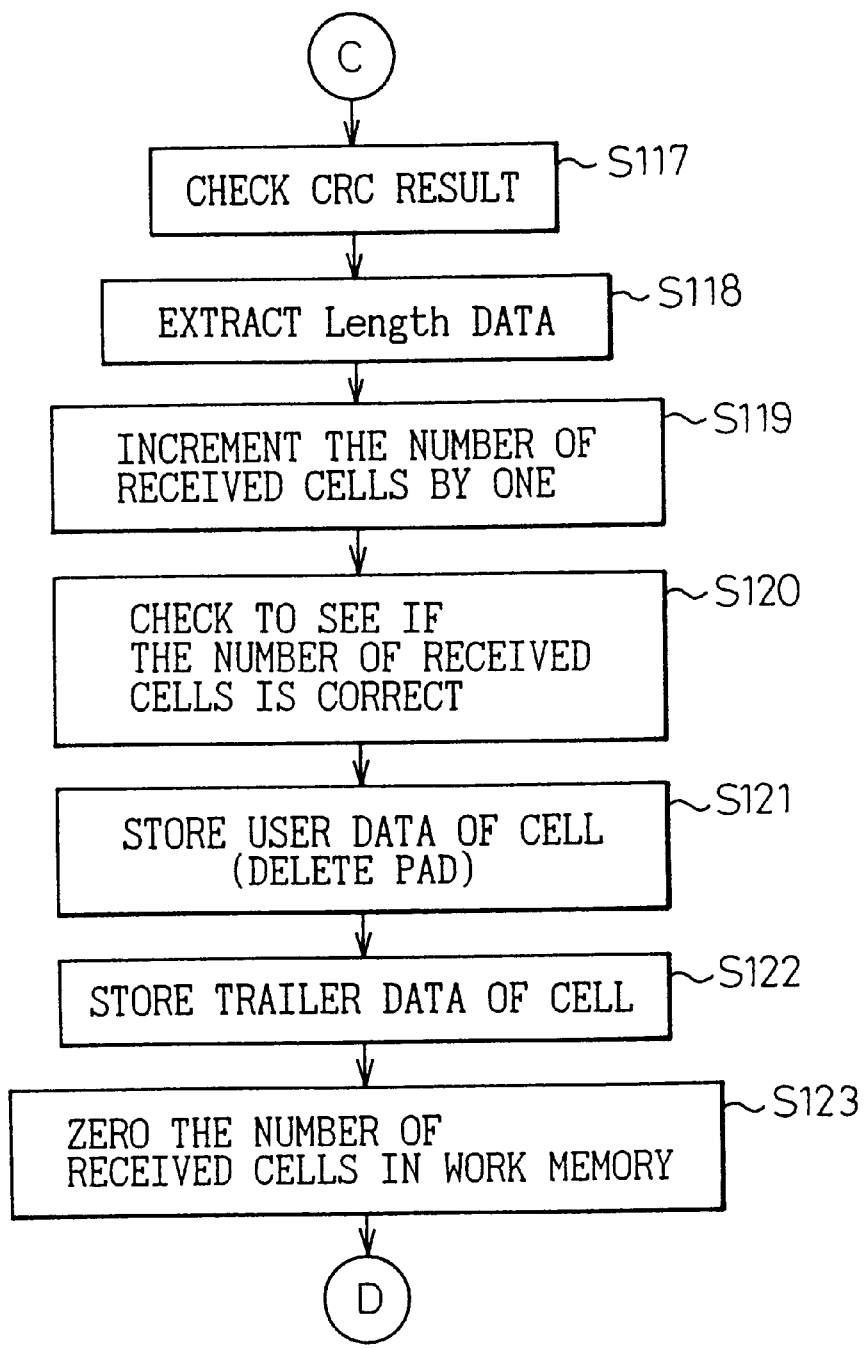

FIG. 4 is a block diagram showing a terminating apparatus for an ATM adaptation layer according to an embodiment of the present invention.

The apparatus has a physical layer terminator 4-1, delay units 4-2 and 4-3, a reception processor 4-4, a CRC unit 4-5, a header extractor 4-6, a DMA controller 4-7, a work memory 4-8, and a reception buffer 4-9.

Figure 2:
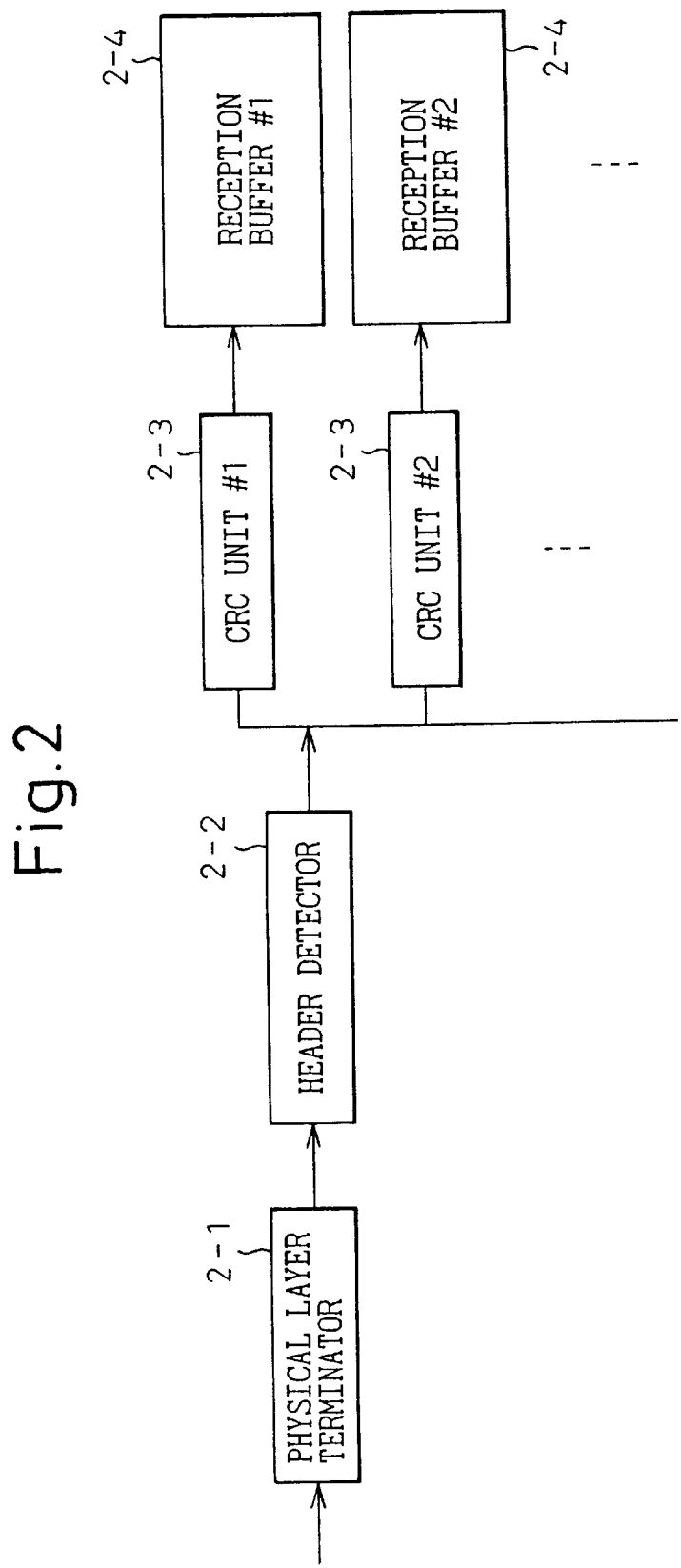
FIG. 2 is a block diagram showing a terminating apparatus for an ATM adaptation layer according to a prior art.
Figure 3:
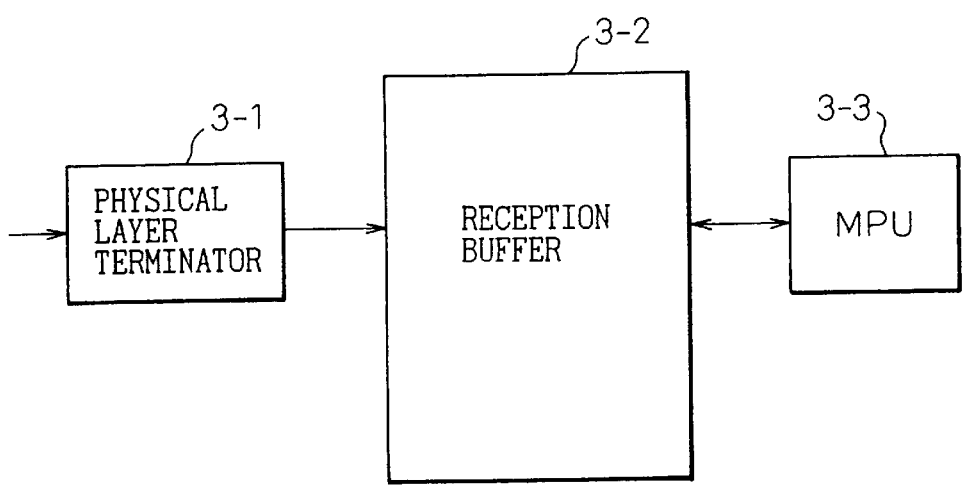
FIG. 3 is a block diagram showing an apparatus employing firmware for terminating connections in an ATM adaptation layer according to a prior art.

The apparatus is characterized by three elements, i.e., the CRC unit 4-5, work memory 4-8, and reception buffer,4-9 that are common to connections to terminate and are independent of the number of connections to terminate, unlike the prior art of FIG. 2 that must have a hardware logic termination circuit for each connection to terminate.

For each received cell related to a connection to terminate, the present invention 1) carries out a cyclic redundancy check by the CRC unit 4-5 and 2) prepares storage areas for each connection in the work memory 4-8 and reception buffer 4-9 to store termination data and payload of each cell of each connection to terminate.

The physical layer terminator 4-1 terminates a physical layer of each received cell and transfers the received cell to the delay unit 4-2 and header extractor 4-6.

The header extractor 4-6 extracts VPI/VCI from a cell header of the received cell, finds a connection related to the received cell according to the VPI/VCI, and transfers the connection to the DMA controller 4-7. The DMA controller 4-7 identifies a work area in the work memory 4-8 for the connection.

For each connection, the work memory 4-8 has an area for storing a CRC result, an address (indicated as ADR in FIG. 4) of the reception buffer 4-9, and the number of received cells. These connection areas are arranged in order of connection numbers. The data quantity of each connection is fixed, and therefore, the storage location of a given connection in the work memory 4-8 is identifiable from a connection number assigned to the connection. For example, the storage area of one connection has a width of "n," and an address 0 in the work memory 4-8 is assigned to a connection #1. Then, data for a connection #m is located at an address of "n×m" in the work memory 4-8.

Data for a connection stored in the work memory 4-8 is used when terminating an AAL message for the connection. Data prepared for a newly received cell is kept until a corresponding ALL message is completely assembled, and when the ALL message is complete, the corresponding data in the work memory 4-8 is reset.

For each connection, the work memory 4-8 stores the number of cells received so far to form an AAL message for the connection. When the AAL message is completely assembled, the corresponding number of received cells is reset.

A cell that contains the last data of an AAL message is identifiable by extracting a payload type indication (PTI) from the header of the cell. For any other cell, it is impossible to determine whether the cell is at the start of or in the middle of an AAL message. To solve this problem, the DMA controller 4-7 receives data about a connection related to a received cell, reads the number of cells from a corresponding part of the work memory 4-8, determines whether or not the number is equal to an initial value, and determines whether or not the received cell is the first one after the termination of an AAL message.

If the received cell is the first cell of an AAL message, the CRC unit 4-5 loads an initial value. If the received cell is not the first cell of an AAL message, the DMA controller 4-7 reads a preceding CRC result (an intermediate result) and the number of received cells from a corresponding address of the work memory 4-8 and loads the read data to the CRC unit 4-5.

The CRC unit 4-5 receives payload data of the received cell through the delay unit 4-2, carries out a cyclic redundancy check on the payload data according to the read CRC result, and informs the DMA controller 4-7 of the result. According to the result, the DMA controller 4-7 updates the corresponding CRC result stored in the work memory 4-8.

In this way, the single CRC unit 4-5 is commonly used to carry out cyclic redundancy checks on cells of different connections.

The delay unit 4-2 generates a delay that is equal to the sum of a time in which the header extractor 4-6 extracts connection data from a received cell and a time in which the DMA controller 4-7 reads the number of received cells and a CRC result from the work memory 4-8 and transfers the read data to the CRC unit 4-5.

Instead of determining whether or not a received cell is the first cell of an AAL message according to the number of received cells stored in the work memory 4-8 and informing the CRC unit 4-5 of the determination, the DMA controller 4-7 may load a CRC result and the number of received cells of a corresponding connection to the CRC unit 4-5 when a cell is received, so that the CRC unit 4-5 may determine whether or not the received cell is the first cell of an AAL message.

An address of the reception buffer 4-9 stored in the work memory 4-8 for each connection indicates the end of an AAL message prepared so far for the connection. Upon receiving a cell for a given connection, the DMA controller 4-7 reads an address corresponding to the connection from the work memory 4-8 and writes payload of the received cell into the reception buffer 4-9 at an address next to the read address. At the same time, the DMA controller 4-7 updates the address of the reception buffer 4-9 in the work memory 4-8. As a result, payloads of cells received for a connection are sequentially written in a corresponding area of the reception buffer 4-9 to prepare an AAL message for the connection.

The delay unit 4-3 delays a received cell by a time necessary for the CRC unit 4-5 to carry out a cyclic redundancy check and transfers the delayed cell to the reception processor 4-4. The reception processor 4-4 determines whether or not the received cell is the last cell of an AAL message according to a payload type indication (PTI) contained in the header of the cell. If the cell is the last cell, the reception processor 4-4 extracts a trailer (FIG. 1) from the received cell and checks to see if the data length of the AAL message received so far is correct. This will be explained in more detail.

Figure 1:
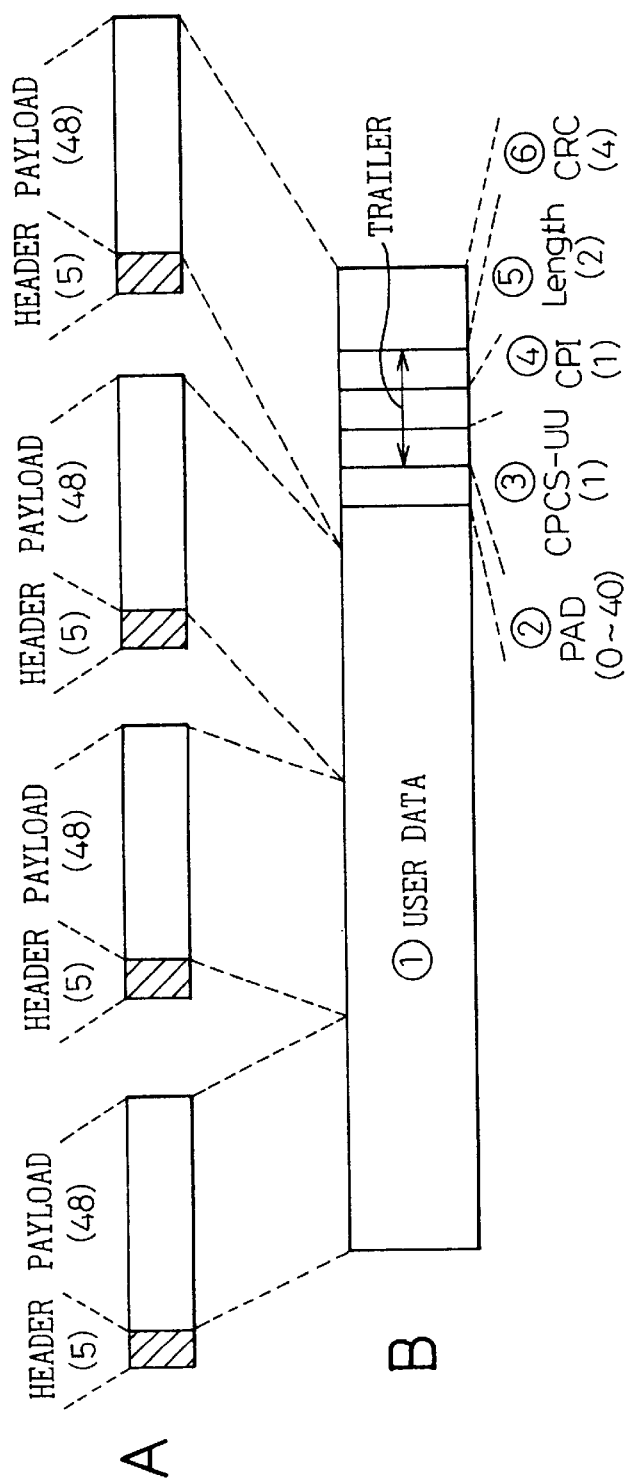
FIG. 1 shows an AAL type-5 frame format.

The reception processor 4-4 adds a length ((5) of FIG. 1) contained in the trailer to the length (8 bytes) of the trailer and CRC fields and divides the sum by 48, which is the number of bytes of the payload of each cell. If the remainder of the division is 0, the reception processor 4-4 checks to see if the quotient is equal to the number of received cells stored in a corresponding area of the work memory 4-8. If the remainder is in the range of 1 to 47, the reception processor 4-4 adds 1 to the quotient and checks to see if the sum is equal to the number of the received cells.

For example, if the length in the trailer indicates 198, the reception processor 4-4 adds 8 to 198 to obtain a sum of 206 and divides the sum by 48 to obtain a remainder of 14. Since the remainder 14 is in the range of 1 to 47, the reception processor 4-4 adds 1 to the quotient 4 to obtain a sum of 5 and checks to see if the sum is equal to the number of received cells stored in a corresponding part of the work memory 4-8. If they are equal to each other, it is determined that the length of a corresponding AAL message is correct.

Thereafter, the reception processor 4-4 transfers the payload of the received cell to the DMA controller 4-7. The DMA controller 4-7 adds 1 to a corresponding address of the reception buffer 4-9 stored in the work memory 4-8 and, at the resultant address of the reception buffer 4-9, stores the payload. At this time, the corresponding address stored in the work memory 4-8 is incremented accordingly. As a result, the reception buffer 4-9 holds data accumulated from received cells for each connection to prepare an-AAL message for each connection.

After an AAL message is completely assembled, the last 8 bytes of the last cell for the AAL message contain the trailer of the AAL message (FIG. 1). The trailer is stored in an area of the reception buffer 4-9 that is different from the area where the user data of the received cells is stored, so that the user data and trailer of each AAL message are separately managed in the reception buffer 4-9.

The processes involving the elements 4-1 to 4-9 may be carried out under the control of the reception processor 4-4 or another controller such as a CPU.

In this way, an upper limit on the number of connections to terminate depends on the capacity of the work memory 4-8. The work memory 4-8 may be a standard semiconductor memory that is easily expandable and is highly integrated to reduce the size of the apparatus. Namely, the apparatus of the present invention is compact and it is easy to increase or change the number of connections to terminate.

The CRC unit 4-5, delay units 4-2 and 4-3, reception processor 4-4, etc., are common to different connections to terminate and are independent of the number of the connections. Accordingly, they can be formed from hardware logic circuits to achieve high-speed termination on cells.

FIGS. 5 to 8 are flowcharts showing the above-mentioned ATM adaptation layer terminating processes carried out by the apparatus of the present invention. A general flow of the processes will be explained with reference to the flowcharts.

Step S101 receives a cell. Step S102 terminates a physical layer of the cell, and step S103 identifies a connection to which the cell is related according to VPI/VCI of the cell. Step S104 reads the number of received cells from an area of the work memory 4-8 corresponding to the identified connection. Step S105 checks to see if the number of the received cells is zero. If it is zero, the received cell is the start cell of the connection, and if it is above zero, the received cell is an intermediate cell. If the received cell is the start cell, step S106 loads an initial value to the CRC unit 4-5 to carry out a cyclic redundancy check on the start cell and cells that follow the start cell of the same connection.

If the received cell is an intermediate cell, step S107 reads a corresponding CRC result from the work memory 4-8, and step S108 loads the read CRC result to the CRC unit 4-5 to carry out a cyclic redundancy check on the received cell. Namely, step S109 provides the CRC unit 4-5 with data related to the received cell so that the CRC unit 4-5 may carry out a cyclic redundancy check on the received cell. Step S110 writes a CRC result into the work memory 4-8.

Step S111 reads an address of the reception buffer 4-9 where data of the connection related to the received cell is stored from the work memory 4-8, and steps S112 and S113 check to see if the received cell is the last cell of an AAL message to be prepared for the connection, according to a payload type indication (PTI) of the received cell. If the received cell is not the last cell, step S114 writes data contained in the received cell into the reception buffer 4-9 at an address that follows the address read in step S111, step S115 updates the reception buffer address in the work memory 4-8, and step S116 increments the number of received cells in the work memory 4-8 related to the connection in question by one. Thereafter, the flow waits for the next cell.

If the received cell is the last cell in step S113, step S117 checks the CRC result to see if the received data is correct.

Step S118 extracts length data from a trailer of the received cell, step S119 adds 1 to the number of cells received so far for the connection in question, and step S120 checks to see if the number of the received cells is correct according to the length data. Step S121 picks up only user data from the received cell according to the length data and writes the user data into the reception buffer 4-9 at an address that follows the address read in step S111. Step S122 writes the trailer data of the received cell into a corresponding area of the reception buffer 4-9. This completes the reception of the message for the connection in question, and step S123 zeroes the number of received cells in the corresponding area of the work memory 4-8 to release the area for another connection.

As explained above, the apparatus of the present invention terminates connections simultaneously set in an ATM adaptation layer by commonly using, for example, a CRC unit that operates at high speed. The apparatus of the present invention is made of hardware logic circuits whose number is independent of the number of connections to terminate. Unlike the prior art that must have a CRC unit for each path to produce redundant CRC units to waste power, the apparatus of the present invention needs little power to operate, is small, and carries out a termination process at high speed.

What is claimed is:

1. A terminating apparatus of an ATM adaptation layer for terminating received cells, connection by connections, and assembling an ATM adaptation layer message for each connection from data contained in the received cells, comprising:

a header extraction means for extracting a virtual path indication/virtual channel indication (VPI/VCI) from a received cell;

a CRC means shared by different connections of the ATM adaptation layer message to perform a CRC calculation for the payload data of the received cell;

a reception process means for determining, based on a payload type indication contained in the header of the received cell, whether or not the received cell is the last cell of an ATM adaptation layer message prepared for a connection related to the received cell and processing the received cell;

a work memory for storing, for each connection, a CRC result and the number of received cells; and a reception buffer for sequentially storing, for each connection, data extracted from the received cells.

2. A terminating apparatus of an ATM adaptation layer for terminating received cells, connection by connection, and assembling an ATM adaptation layer message for each connection from data contained in the received cells, comprising:

a header extraction means for extracting a virtual path indication/virtual channel indication (VPI/VCI) from a received cell;

a CRC means shared by "of the ATM adaptation layer message to perform a CRC calculation for the payload data of the received cell" different connections;

a reception process means for determining, based on a payload type indication contained in the header of the received cell, whether or not the received cell is the last cell of an ATM adaptation layer message prepared for a connection related to the received cell and processing the received cell;

a work memory for storing, for each connection, a CRC result and the number of received cells; and a reception buffer for sequentially storing, for each connection, data extracted from the received cells;

wherein the work memory has, for each connection, a part for storing an address of the reception buffer where the latest data received for the connection is stored; and, when a cell related to the connection is received, the reception process means reads the stored address and stores data extracted from the received cell related to the connection into the reception buffer at an address just after the read address.

3. The apparatus of claim 1, wherein:

the header extraction means, CRC means, and reception process means are common to all connections to terminate; and the work memory and reception buffer are each a memory that is expandable to cover an increase in the number of connections to terminate.

4. A terminating apparatus of an ATM adaptation layer for terminating received cells, connection by connection, and assembling an ATM adaptation layer message for each connection from data contained in the received cells, comprising:

a header extraction means for extracting a virtual path indication/virtual channel indication (VPI/VCI) from a received cell;

a CRC means shared by "of the ATM adaptation layer message to perform a CRC calculation for the payload data of the received cell" different connections;

a reception process means for determining, based on a payload type indication contained in the header of the received cell, whether or not the received cell is the last cell of an ATM adaptation layer message prepared for a connection related to the received cell and processing the received cell;

a work memory for storing, for each connection, a CRC result and the number of received cells; and a reception buffer for sequentially storing, for each connection, data extracted from the received cells;

wherein the reception process means determines whether the received cell is at the start, or in the middle, or at the end of the corresponding connection according to the determination whether or not the received cell is the last cell of the ATM adaptation layer message prepared for the corresponding connection, updates a CRC result and the number of received cells of the corresponding connection in the work memory, and processes a payload of the received cell; and the apparatus further has DMA control means for transferring, for each connection, a CRC result between the CRC means and the work memory according to a VPI/VCI extracted by the header extraction means and transferring data extracted from a received cell to the reception buffer according to an instruction from the reception process means.

5. The apparatus of claim 4, wherein the reception process means:

determines that the received cell is the start cell of the ATM adaptation layer message if the number of received cells of the corresponding connection is zero and if the received cell is not the last cell of the ATM adaptation layer message, operates the CRC means from an initial state, stores a CRC result in a corresponding area of the work memory, and increments the number of received cells by one;

determines that the received cell is an intermediate cell of the ATM adaptation layer message if the number of received cells of the corresponding connection is not zero and if the received cell is not the last cell of the ATM adaptation layer message, reads a CRC result acquired on the preceding cell from the corresponding area of the work memory, loads the read CRC result to the CRC means, operates the CRC means accordingly, updates the CRC result in the work memory accordingly, and increments the number of received cells by one; and assembles the ATM adaptation layer message from data sequentially stored in the reception buffer for the corresponding connection if the received cell is the last cell of the ATM adaptation layer message and resets the CRC result and the number of received cells in the corresponding area of the work memory to zero.

6. The apparatus of claim 5, wherein:

the reception process means compares, if the received cell is the last cell of the ATM adaptation layer message, the number of cells received in connection with the corresponding connection stored in the corresponding area of the work memory with a user data length stored in a trailer of the assembled ATM adaptation layer message, and determines whether or not the data length of the assembled ATM adaptation layer message is correct.

7. The apparatus of claim 6, wherein:

The reception process means refers to the user data length stored in the trailer of the assembled ATM adaptation layer message and separately stores the user data and trailer of the message in the reception buffer.

8. The apparatus of claim 1, wherein:

The ATM adaptation layer message is a message on an ATM adaptation layer type 5 protocol.

* * * * *